Figure 3:
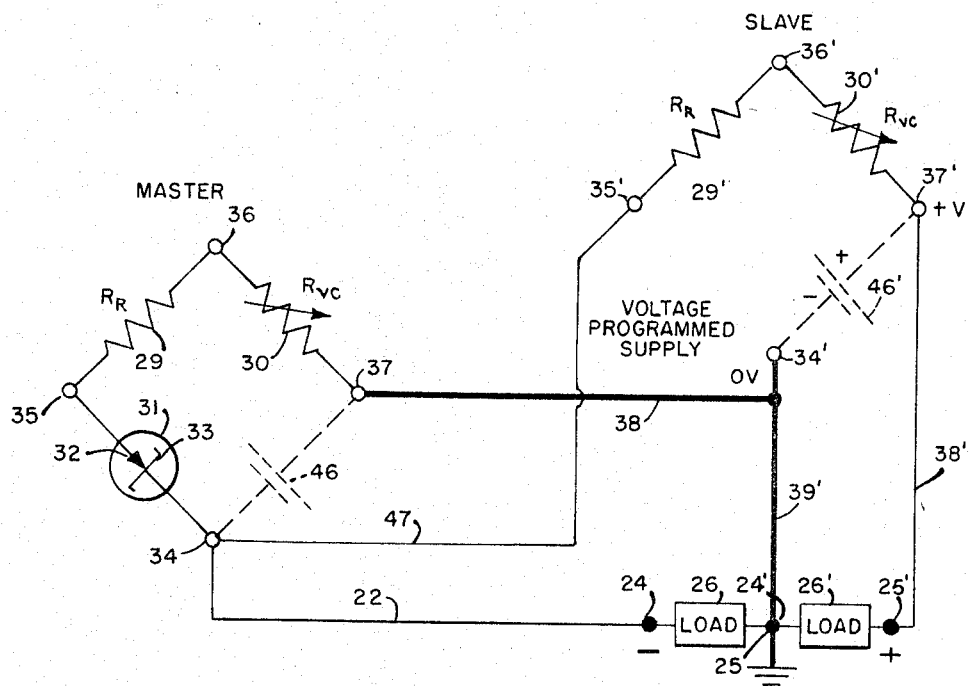

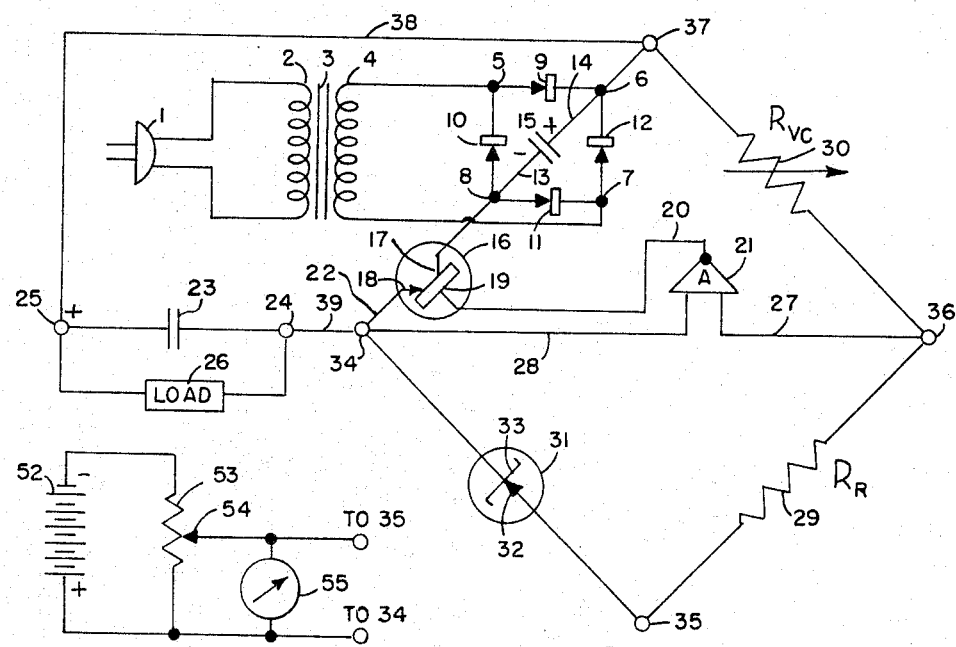
FIG. 1
FIG. 1A
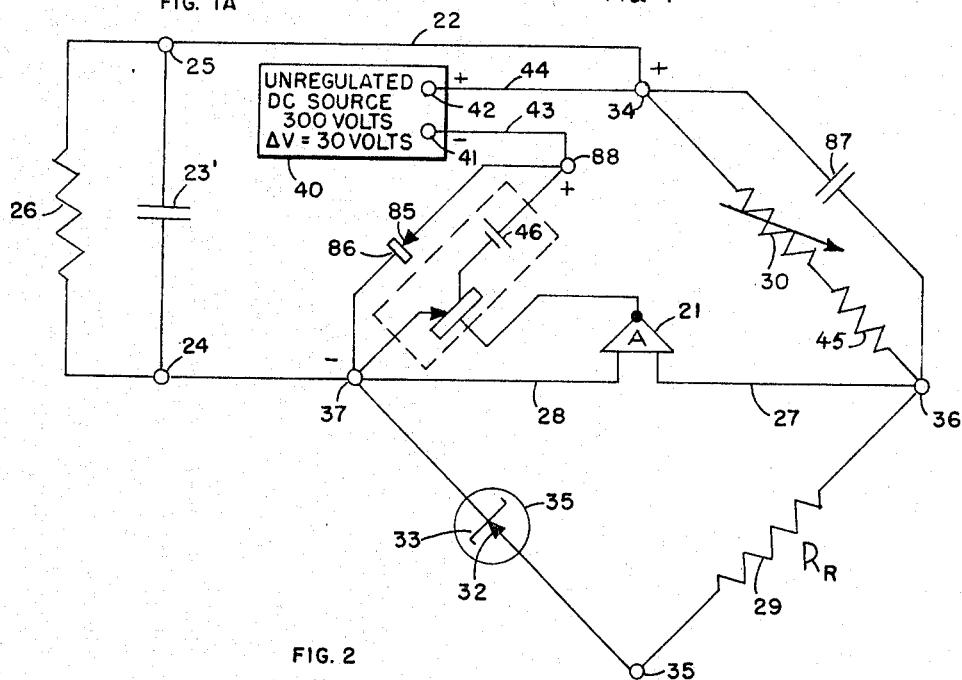
FIG. 2
INVENTOR.
KENNETH KUPFERBERG
BY
*Alfred W. Barber*
ATTORNEY INVENTOR.
KENNETH KUPFERBERG
BY
*Alfred W. Barber*
ATTORNEY Sept. 27, 1966  K. KUPFERBERG  3,275,927
BRIDGE CONTROLLED MULTIPLE REGULATED POWER SUPPLIES
Filed March 15, 1962  4 Sheets-Sheet 3

INVENTOR.
KENNETH KUPFERBERG
BY
Alfred W. Barber
ATTORNEY

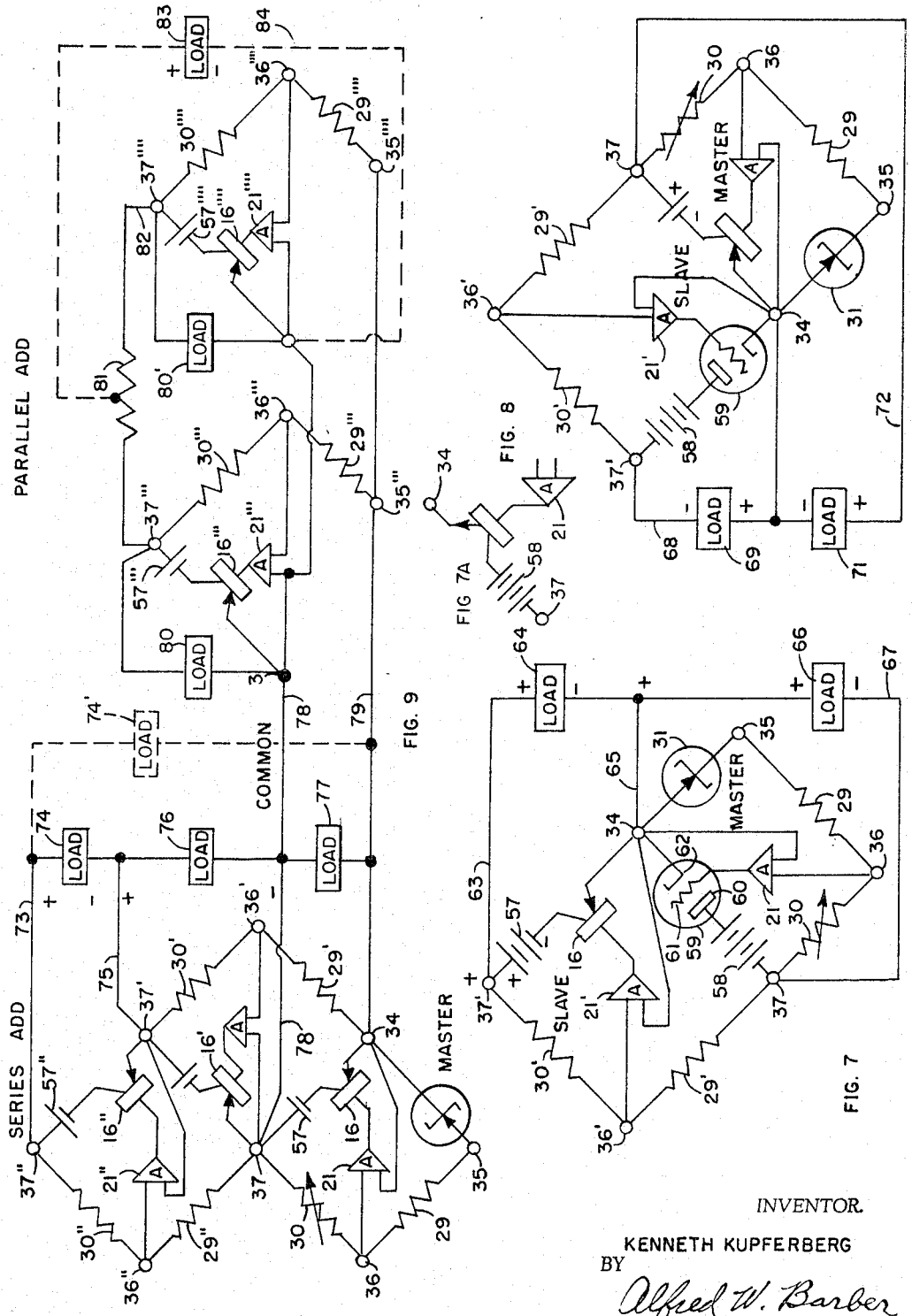

United States Patent Office 3,275,927
Patented Sept. 27, 1966

3,275,927
BRIDGE CONTROLLED MULTIPLE REGULATED POWER SUPPLIES
Kenneth Kupferberg, Flushing, N.Y., assignor to Forbro Design Corp., New York, N.Y., a corporation of New York
Filed Mar. 15, 1962, Ser. No. 179,851
8 Claims. (Cl. 323—22)

The present invention concerns regulated power supplies and in particular, various combinations of regulated and unregulated power supplies controlled by one or more bridge control circuits.

Many circuits have been used for current or voltage regulation of power supplies. One of the most useful and versatile regulation systems utilizes a bridge circuit comprising a fixed reference voltage arm, a fixed resistor arm, a variable resistor arm and an arm embracing a source of voltage and the load circuit. An error amplifier connected across one diagonal of the bridge provides a control signal to a pass element connected between the source of voltage and the load circuit to control the load voltage in accordance with the setting of the variable resistor. This circuit is shown and described in United States Patent No. 3,028,538. It has been found that this circuit is not only a superior circuit for voltage regulated power supplies but also that it may be utilized in many unique combinations of multiple power supplies.

It has been found that while the basic circuit is ordinarily utilized by varying the voltage control resistor to vary the regulated voltage, that the circuit may be adapted to be voltage controlled. This discovery leads to many unique combinations. For example two regulated power supplies may be operated together with one replacing the reference voltage of the other and thus providing a circuit in which the second power supply is partly controlled by the first. The second power supply may be operated to provide a voltage equal to the first and of opposite polarity with respect to a common point or the second supply may be made to supply a proportional voltage. Another combination provides a constant current with a regulated supply controlling a second voltage regulated supply wherein various voltage combinations of controlling and controlled supplies may be used. Still another combination is provided with a relatively low voltage regulated power supply in series with a relatively high voltage unregulated power supply to supply a high voltage regulated output. Another mode of operation involves remote control and programming by means of a voltage which may be readily transmitted to remote points. Further combinations utilize a master supply with controlled or slave supplies in multiple series and parallel combinations.

Accordingly one object of the present invention is to provide methods of and means for operating multiple regulated power supplies in various interdependent relationships.

Another object is to provide regulation for an unregulated power supply by means of a smaller regulated power supply.

Still another object is to provide two or more regulated power supplies in which one of these power supplies controls the others by means of a transmitted voltage.

A further object is to provide constant current from regulated sources utilizing one controlling supply and one or more controlled supplies.

A still further object is to provide remote control and programming of regulated power supplies by means of a control voltage.

These and other objects of the present invention will be apparent from the detailed description of the invention given in connection with the description of the various figures of the drawing.

Figure 4:
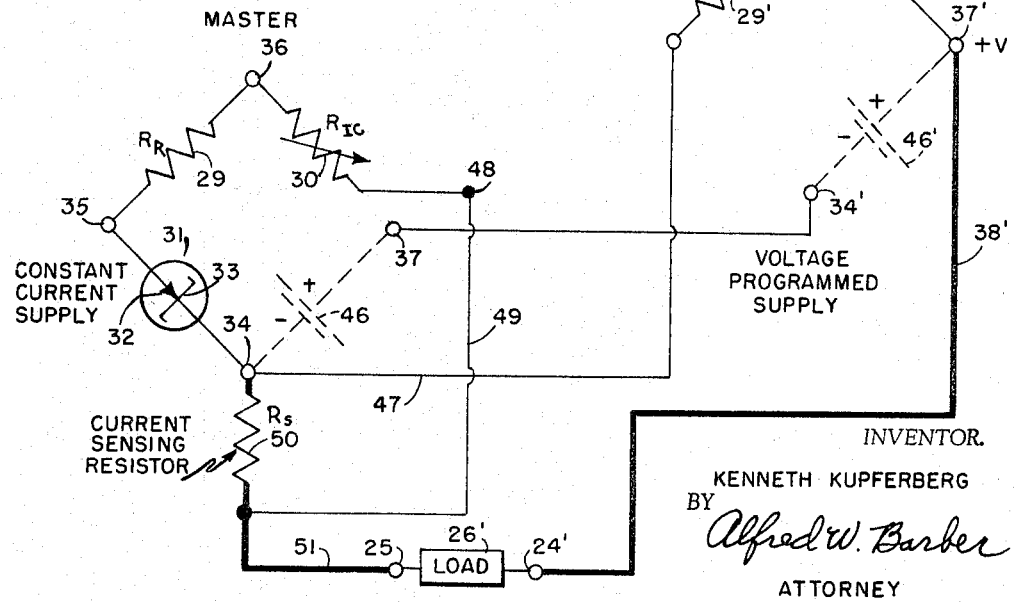
Figure 5:
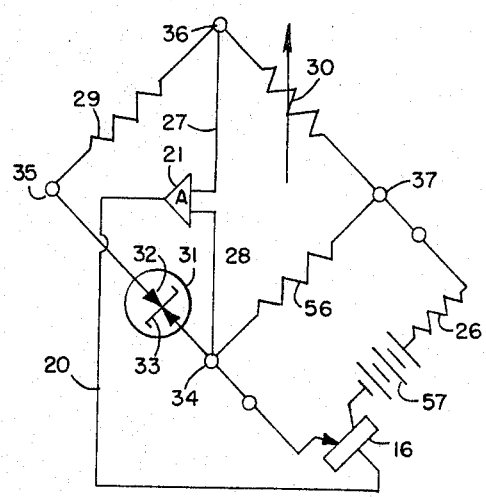
Figure 6:
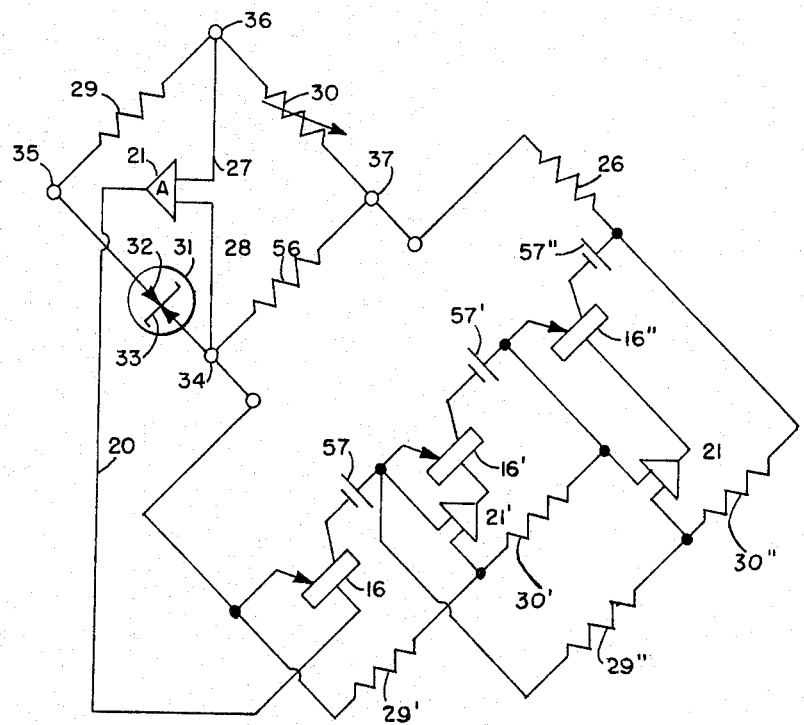

In the drawing:
FIGURE 1 is a schematic circuit diagram of the basic regulated power supply utilizing a bridge control circuit.
FIGURE 1A is a schematic circuit of a control for remote control or programming by means of a voltage control of the bridge circuit.
FIGURE 2 is a diagram partly schematic and partly in block diagram of an unregulated power supply connected in series with a regulated power supply to provide a regulated voltage to a load.
FIGURE 3 is a schematic circuit diagram of two regulated power supplies utilizing a bridge control circuit and in which one supply operates to control the other.
FIGURE 4 is a schematic circuit diagram of one regulated power supply in control relationship to a second regulated power supply for supplying constant current to a common load.
FIGURE 5 is a schematic circuit diagram of the bridge circuit in a constant current configuration.
FIGURE 6 is a schematic circuit diagram of the bridge circuit in control relationship to a plurality of series connected regulated power supplies for supplying a controlled current to a load.
FIGURE 7 is a schematic circuit diagram of a hybrid (transistor and tube) voltage regulated power supply providing control to a transistorized regulated power supply in "master" and "slave" relationship for supplying regulated voltage to two load circuits connected in series.
FIGURE 7A is a modification of FIGURE 7 showing the use of a transistor instead of the vacuum tube.
FIGURE 8 is a schematic circuit diagram of a transistorized voltage regulated power supply providing control to a hybrid voltage regulated power supply in "master" and "slave" relationship for supplying regulated voltage to two load circuits connected in series.
FIGURE 9 is a schematic circuit diagram of a bridge circuit voltage regulated power supply connected to control a plurality of series adding regulated power supplies and a plurality of common negative or parallel adding regulated power supplies.

FIG. 1 shows a plug 1 for connecting to a source of alternating current and supplying primary 2 of power transformer 2–3–4. Secondary 4 is connected to a suitable rectifier such as the bridge rectifier formed of rectifiers 9, 10, 11 and 12 connected to the four rectifier bridge terminals 5, 6, 7 and 8. The alternating current input to the rectifier bridge is connected across a diagonal and to terminals 5 and 7 while the rectified direct current output is taken from the other diagonal at terminals 6 and 8. The direct current output appears on leads 13 and 14 and is filtered by suitable means such as capacitor 15. The direct current circuit from lead 13 is passed through a suitable controllable pass device such as transistor 16 and over lead 22 to bridge terminal 34 and over further lead 39 to load terminal 24. The direct current circuit from lead 14 is passed to load terminal 25 and over lead 38 to terminal 37 of the control bridge circuit. Load 26 is connected across terminals 24 and 25 as is the stabilizing capacitor 23. The control bridge includes the four terminals 34, 35, 36 and 37 and a suitable reference voltage device such as Zener diode 31 having cathode 33 and anode 32 connected between terminals 34 and 35; a fixed reference resistor 29 connected between terminals 35 and 36; a variable voltage control resistor 30 connected between terminals 36 and 37 and the parallel direct current source and load just described connected between terminals 34 and 37. As has been described in detail in U.S. Patent No. 3,028,538, this bridge will be in balance when the voltage drop across resistor 29 equals the reference voltage across Zener diode 31, and the voltage drop across load 26 equals the voltage drop across control resistor 30. If the bridge is not balanced, due to the load voltage not being equal to the drop across voltage control resistor 30, a resultant voltage or so called error signal appears between terminals 34 and 36. This error signal is applied to a suitable amplifier such as amplifier 21, over leads 27 and 28. The amplified output of amplifier 21 is applied to the control element, in the example shown, the base 19 of transistor 16, to control the conduction between collector 17 and emitter 18 and thereby to bring the load voltage into equality with the voltage across control resistor 30 and at the same time to balance the bridge.

Typical values can be given to the bridge elements. For example, if the reference voltage across zener diode 31 is 6 volts and reference resistor 29 is 6000 ohms, 1 milliampere of current will flow through resistor 29 and the same 1 milliampere will flow through voltage control resistor 30 since, at balance, substantially no current will leave terminal 36 over lead 27. Thus, voltage control resistor 30 will control the load voltage at 1 volt per 1000 ohms.

Now it has been found that the regulated voltage across the load as shown in FIG. 1 may be controlled by keeping resistor 30 set at a predetermined value and varying the reference voltage between bridge terminals 34 and 35. For example, if the circuit has been adjusted to supply 50 volts across the load by setting resistor 30 at 50,000 ohms, and the reference voltage between terminals 34 and 35 is changed from 6 volts to say 12 volts, the regulated load voltage will be changed from 50 to 100 volts. In this way the load voltage may be set to a different regulated value by changing the reference voltage. This mode of operation has several novel applications as, for example, for remote control or programming by means of a control voltage.

FIG. 1A shows a simple basic circuit for providing a control voltage which may be applied to terminals 35 and 34 in place of the zener reference in FIG. 1. A suitable voltage source such as battery 52 is provided with a suitable control such as potentiometer 53. The voltage picked off by movable contact 54 and between it and the battery return lead is applied to terminals 35 and 34 and may be measured if desired by a suitable means such as meter 55. As has been set forth above, the bridge (FIG. 1) may be set up so that the regulated load voltage bears a predetermined relationship to the reference voltage so that if the control voltage is known the resulting regulated load voltage will also be known.

FIG. 2 shows how a relatively small regulated power supply utilizing the above described bridge circuit may be used in combination with a relatively large unregulated power supply to provide a regulated output voltage to a load. The control bridge is similar to that shown in FIG. 1 and corresponding parts bear corresponding designations. A simplified representation has been made in which the source of voltage (1 through 15) for the regulated supply is shown as a battery 46. In the present combination an unregulated direct current voltage source 40 is provided. This unregulated source is assumed to have a nominal voltage output, for purposes of illustration 300 volts D.C., and a variation which is some predetermined percentage, say 10, of the main voltage, and hence in this case up to 30 volts. This unregulated voltage of 300, which may vary to 300 minus 30 or 270 volts, appears across output terminals 41 and 42. Terminal 42, the positive terminal, is connected to the load 26, to be supplied with regulated voltage, and lead 44 terminal 34 and lead 22 to positive terminal 25. The negative terminal 41 is connected over lead 43 to the positive terminal of 46 of the bridge controlled power supply, and terminal 37 is connected to the negative terminal 24 of load 26. To complete the circuit, voltage control resistor 30 is increased by a large fixed resistor 45 to represent the voltage from source 40, and this combination resistor is connected between terminals 36 and 34. With these connections the bridge controlled regulated voltage between terminals 37 and 88 adds to the voltage from the unregulated source 40 so as to maintain the voltage across load 26 constant. Control resistor 30 allows setting output voltage of the combination to the desired constant value. Thus a regulated output may be secured from a relatively large unregulated power supply combined with a relatively small regulated power supply. This combination combines economy with flexibility of design and greatly extends the usefulness of both the unregulated and regulated supplies. An unexpected advantage results when the large output capacitor 23' is connected across the load 26, which is also across the combined outputs of the regulated and unregulated power supplies, rather than across the terminals 37 and 88 of the regulated power supply only, since this connection allows the regulated power supply to provide fast correction to the system thereby reducing transients and hum voltage from the unregulated supply.

FIG. 2 also shows a protective device which has been found to be very useful in systems utilizing power supplies in various combinations. Here a diode is connected from the positive side of source 46 to terminal 37 of the regulated supply with anode 85 connected to the negative terminal 34 and cathode 86 connected to the positive terminal of source 46. Thus during normal operation of the supplies, the diode is reverse biased and passes very little current. However, if the regulated supply is turned off before the unregulated supply, the unregulated supply will attempt to place a voltage across the regulated supply in such a direction as to make terminal 34 positive which may cause damage to the regulated supply. The diode 85–86 being forward biased in this case shorts out this potentially damaging voltage and protects the regulated supply from reverse over-voltage.

FIG. 3 shows how two voltage regulated power supplies utilizing the above described bridge circuit may be operated in a "master" and "slave" combination. The master control utilizes the bridge having terminals 34–35–36–37 as described above and wherein "battery" 46 is shown to represent the regulated voltage as set forth in connection with FIGS. 1 and 2. This master supply supplies a regulated voltage to load 26 over lead 22 and 38–39' to terminals 24 and 25 under control of voltage control resistor 30. The "slave" regulated supply is shown with primed corresponding nomenclature. The bridge terminals are 34'–35'–36'–37' and the regulated supply is represented by "battery" 46'. The reference voltage between terminals 34' and 35' of the slave supply is derived from the output of the master supply over leads 38 and 47. The slave supply is connected to load 26' at terminals 25'–24' over leads 38' and 39'. The voltage supplied to load 26 from the master supply will be the normal regulated voltage as set forth in connection with FIG. 1. The regulated voltage supplied to load 26' will be a function of the setting of the control resistor 30' and the voltage supplied between terminals 34'–35' by the master control. For example, if resistor 30' is set for a unity relationship between reference voltage and regulated output voltage, the voltage across load 26' will at all times be equal to the voltage across load 26 and terminals 34'–35'. Thus, if the voltage across load 26 is changed by changing voltage control resistor 30, the voltage across load 26' will be changed by the same amount. However, if voltage control resistor 30' is changed to other than a unity relationship to resistor 30, a proportional relationship will be established in which the voltage across load 26' is made equal to the voltage across load 26 times a proportionality factor. This factor may be any factor within the range of the slave supply as, for example, one-half, twice, etc.

Other combinations will be evident based on the functioning set forth in connection with FIG. 2. Additional slave regulated power supplies may be connected to the combination in which either "master" or "slave" supplies may act as master of one or more additional supplies.

The reference voltage across terminals 34–35 of the master supply may be replaced by an external controlled voltage for remote control or programming of the whole system. Many combinations based on the functioning here set forth and described will be apparent to those skilled in the art.

FIG. 4 shows another combination involving "master" and "slave" regulated power supplies operated in a novel and useful relationship. In this combination a first or master voltage supply controls a second or slave voltage supply providing a constant current to a load. The master supply senses the current in a current sensing resistor in series with the load. The voltage across the current sensing resistor when connected in series with the voltage across the current control resistor of the master bridge circuit provides a source of controlled voltage which is connected to the reference voltage terminals of the slave supply control bridge and thereby controlling the output voltage to the load. This arrangement provides a system exhibiting a highly precise control and a wide range of output current to a wide range of load resistors since supplies of almost any voltage range may be used in the combination. This system may be termed a voltage compliance extension mode of operation.

In detail, FIG. 4 includes "master" and "slave" units similar to and similarly designated to those shown in FIG. 3. However, only a single load 26' connected to terminals 24' and 25' is energized from the regulated supplies. The "master" supply is controlled by the setting of current control resistor 30 and the current flowing through current sensing resistor 50 connected in series with it. Thus the current may be set but once set it will be maintained constant. The "slave" bridge receives its reference voltage from the "master" voltage supply as in the case of FIG. 3. Thus, the "master" bridge senses the current supplied by the "master" and "slave" voltage supplies operating together and controls it. As in the case of the combination shown in FIG. 3 this arrangement of FIG. 4 can be remotely controlled or programmed by substituting a controlled voltage for the reference voltage device 31 connected between terminals 34 and 35. A very wide range of compliance is possible since the "master" and "slave" supplies may provide similar voltages or quite dissimilar voltages as when the "master" source is a low voltage source and the "slave" source is a high voltage source.

FIG. 5 shows the control bridge connected as a constant current control device. The control bridge elements including the zener reference diode 31, the fixed resistor 29 and the variable control resistor 30 are connected to control bridge terminals 34, 35, 36 and 37 and for the purpose described above. In order to monitor current, a known fixed resistor 56 is connected between terminals 34 and 37 and the current supply 57, pass device 16 and load resistor 26 in series are shunted across it. Since the control bridge operates to maintain a predetermined voltage across terminals 34–37 and the value of resistor 56 is known, the current through load 26 will be known. The current range may be changed by changing resistor 56. The zener diode in this and subsequent figures is shown with a second cathode 32' and thus represents a double anode zener as often employed in temperature compensated units.

FIG. 6 shows a plurality of regulated power supplies connected in series for supplying a regulated current to a load resistor 26. The master control bridge 31–29–30 monitors the current by controlling in such a way as to maintain constant voltage across resistor 56 (as in FIG. 5 above). FIG. 6 functions like the circuit of FIG. 4 but is shown in simplified form to show how one master control can be utilized in an extended compliance circuit with several cascaded power supplies acting as slaves. The voltage source 57 and pass transistor 16 controlled from error amplifier 21 may be considered as a part of the "master" system and they supply reference voltage to the first "slave" supply which includes voltage source 57' pass transistor 16' and bridge resistors 29' and 30'. This first "slave" supply provides reference voltage to the second "slave" supply which includes voltage source 57", pass transistor 16" and bridge resistors 29" and 30". The "master" and two "slave" supplies are in series so that while the current for the system is determined by the "master" supply as set forth above, the total available voltage is the sum of the "master" and two "slave" supplies. This compliance extension may be carried on to any practical number of supplies. It will be understood that the primed numbers designate parts of the "slave" circuits fulfilling functions of parts designated by corresponding numbers of the "master" supply.

The combination shown in FIG. 7 is similar to the combination of FIG. 3 except that instead of utilizing two transistorized voltage regulated power supplies it utilizes one hybrid regulated power supply and one transistorized regulated power supply. The hybrid supply is connected to act as the master while the transistorized supply acts the slave. The unprimed numbers designate the control bridge elements of the master supply while the primed numbers designate the slave supply control bridge elements all corresponding with the use of numbers in describing the prior figures above. The voltage source of the master supply is shown as a battery 58 for purposes of illustration although it will be understood to represent any suitable source of current, usually a power transformer, rectifier and filter combination. This use of a battery symbol to represent such power source is used generally in this specification for the sake of simplicity of illustration and is to be taken as set forth above. In certain cases, as when only a low voltage is to be handled, tube 62 may be replaced by an NPN tranisitor connected in series with the voltage source 58 and across terminals 34 and 37 as shown in FIG. 7A.

The pass device of the hybrid supply is vacuum tube 59 including at least a plate 60, a control grid 61 and a cathode 62 heated by suitable means, not shown. The control bridge operates through error amplifier 21 which drives control grid 61 to control the voltage between terminals 34 and 37 in accordance with the setting of voltage control resistor 30. The slave transistorized supply is connected to the hybrid supply so that the hybrid controlled output voltage serves as the reference voltage between terminals 34 and 37. The operation of this combination is thus similar to that shown and described in connection with FIG. 3. The combination here shown in FIG. 7 supplies load 64 connected over leads 63 and 65 and load 66 connected over leads 65 and 67. Since the hybrid supplies are generally high voltage supplies when compared with transistorized supplies and transistorized supplies are often the higher current supplies, the utility of the combination will be apparent.

FIG. 8 also shows a combination of hybrid and transistorized supplies but in this case the transistorized supply acts as the master supply and the hybrid supply as the slave. The output of the transistorized supply across terminals 34 and 37 acts as the reference voltage of the hybrid supply. Here again two loads are supplied one being 69 connected over leads 68 and 70 and the other 71 connected over leads 70 and 72. The utility of this combination as in the case of FIG. 7 resides largely in the usually higher voltages supplied by hybrid supplies and the often higher current supplied by transistorized supplies. Another feature might be one of economy in which high voltage is supplied by a hybrid supply and low voltage by a transistorized supply.

FIG. 9 shows a master supply with a plurality of series connected slave supplies and a plurality of parallel connected slave supplies. The master supplies the control bridge and other elements of which are shown with unprimed number designations is connected to the first series slave supply designated with single primed numbers as the reference voltage and to the first common negative or parallel slave supply designated with triple primed corresponding numbers as the reference voltage thereof. The first series connected slave supply is connected to a second series slave supply as the reference voltage thereof and designated with corresponding double primed numbers. The first series slave supply is connected to load 76 over leads 75 and 78 while the second series slave supply is connected to load 74 over leads 73 and 75, and the master supply is connected to load 77. Thus starting with common lead 78 as the negative side of the series circuit, loads and voltage supplies are added in a positive direction (lead 73) in a manner which can be extended to any reasonable number of co-acting supplies. While independent loads are shown, a common load as shown at 74' connected by dotted lines from lead 79 to lead 73 may be supplied or a combination of independent, series or parallel connected loads.

In the parallel chain the first slave supply designated by the tripple primed corresponding numbers is connected to a second parallel slave as reference voltage and designated by quadruple primed numbers. These two slave supplies may supply independent loads 80 and 80' respectively or they may operate in parallel feeding load 83 over lead 84 with the use of a load equalizing resistor 81 connected between the supplies. These parallel connected slave supplies can also be extended to any reasonable number of parallel connected supplies with independent common negative loads or a common load in circuits corresponding to those of the first two parallel connected supplies.

The circuits of FIGS. 7 and 8 may also supply common loads or combinations of common and independent loads as set forth in connection with FIG. 9 above. Also in certain cases, as when only a low voltage is to be handled, tube 62 of FIG. 7 or tube 59 of FIG. 8 may be replaced by an NPN transistor as indicated in FIG. 7A.

While a number of variations of the present invention have been shown and described, many other variations will be apparent to those skilled in the art and within the spirit and scope of the invention as set forth in particular in the appended claims.

What is claimed is:

1. In a regulated power supply system the combination of, a first regulated power supply utilizing a bridge circuit including at least a source of reference voltage, a fixed reference resistor, a variable output voltage control resistor and an output circuit, a second regulated power supply utilizing a bridge circuit similar in recited components and their functions to the bridge circuit of said first regulated power supply, and connections between said output circuit of said first supply and the reference voltage arm of said second supply whereby said second supply operates in a slave relationship to said first supply.

2. A regulated power supply system as set forth in claim 1 and including interconnections between said output circuits of said first and second supplies to form an output voltage circuit carrying the sum of the output voltages of said first and second supplies.

3. A regultaed power supply system as set forth in claim 1 and including connections for adding the outputs of said first and second supplies and wherein the output voltage of said second supply is a function of the output voltage of said first supply and the voltage control resistor of said second supply.

4. A regulated power supply system utilizing a plurality of bridge circuits each with four arms including in combination, a first bridge circuit with a source of reference voltage in the first of said arms, a reference resistor in the second of said arms, a voltage control resistor in the third of said arms, and a controlled voltage source in the fourth of said arms, a plurality of additional bridge circuits similar in recited components and their functions to said first bridge circuit wherein the fourth arm of said first bridge is connected to form the first arm of said additional bridges.

5. A regulated power supply system as set forth in claim 4 and including load circuit connections to the fourth arms of at least said additional bridge circuits.

6. A regulated power supply system utilizing a plurality of bridge circuits each with four arms including in combination, a first bridge circuit with a source of reference voltage in the first of said arms, a reference resistor in the second of said arms, a voltage control resistor in the third of said arms, and a controlled voltage source in the fourth of said arms, at least a second and third additional bridge circuit similar in recited components and their functions to said first bridge circuit wherein the fourth arm of said first bridge is connected to form the first arm of said second bridge circuit and the fourth arm of said second bridge circuit is connected to form the first arm of said third bridge circuit.

7. A regulated power supply system as set forth in claim 4 and including a load circuit connected in parallel with the fourth arms of at least two of said bridge circuits.

8. A regulated current power supply system including in combination, a first regulated power supply utilizing a four element bridge circuit including at least a source of reference voltage, a fixed reference resistor, a variable output voltage control resistor, and a pair of output terminals including in parallel a source of controlled voltage, and a second regulated power supply utilizing a bridge circuit similar in recited components and their functions to the bridge circuit of said first regulated power supply, a current sensing resistor connected in series with the first said variable output voltage control resistor, and connections between said output terminals of said first regulated supply and the reference voltage arm of said second supply bridge whereby said second supply operates in a slave relationship to said first supply and to maintain regulated current through said current sensing resistor.

References Cited by the Examiner

UNITED STATES PATENTS

| | | | |
|---|---|---|---|
| 2,847,636 | 8/1958 | De Blasio | 323—40 |
| 2,885,630 | 5/1959 | Webb | 323—40 |
| 2,912,638 | 11/1959 | McNamee | 323—22 |
| 3,064,203 | 11/1962 | Wilbur | 323—40 |
| 3,138,752 | 6/1964 | De Blasio | 323—22 |
| 3,161,778 | 12/1964 | Harrison et al. | |
| 3,185,856 | 5/1965 | Harrison | 307—55 |
| 3,199,015 | 8/1965 | Lackley | 321—19 |

FOREIGN PATENTS 237,316  4/1959  Australia.

JOHN F. COUCH, *Primary Examiner.*

LLOYD McCOLLUM, *Examiner.*

K. D. MOORE, G. P. HAAS, D. L. RAE,
*Assistant Examiners.*